US010900860B2

(12) United States Patent
Hill et al.

(10) Patent No.: US 10,900,860 B2
(45) Date of Patent: Jan. 26, 2021

(54) CONDUIT MONITORING

(75) Inventors: David John Hill, Weymouth (GB);
Magnus McEwen-King, Farnham (GB)

(73) Assignee: QinetiQ Limited

(\*) Notice: Subject to any disclaimer, the term of this patent is extended or adjusted under 35 U.S.C. 154(b) by 2540 days.

(21) Appl. No.: 13/059,795

(22) PCT Filed: Aug. 20, 2009

(86) PCT No.: PCT/GB2009/002058
§ 371 (c)(1),
(2), (4) Date: Feb. 18, 2011

(87) PCT Pub. No.: WO2010/020796
PCT Pub. Date: Feb. 25, 2010

(65) Prior Publication Data
US 2011/0149688 A1 Jun. 23, 2011

(30) Foreign Application Priority Data
Aug. 21, 2008 (GB) .................. 0815297.7

(51) Int. Cl.
*G01M 3/00* (2006.01)
*G01M 3/24* (2006.01)
*F17D 5/06* (2006.01)
*G01D 5/48* (2006.01)
*G01H 9/00* (2006.01)
(Continued)

(52) U.S. Cl.
CPC ............... *G01M 3/243* (2013.01); *F17D 5/06* (2013.01); *G01D 5/48* (2013.01); *G01H 9/004* (2013.01); *G01M 3/047* (2013.01); *G01P 3/14* (2013.01)

(58) Field of Classification Search
USPC ........................................... 367/87
See application file for complete search history.

(56) References Cited

U.S. PATENT DOCUMENTS 3,949,353 A 4/1976 Waters et al.
4,311,391 A \* 1/1982 Gilmour ........................ 356/481
(Continued)

FOREIGN PATENT DOCUMENTS

CN 2758749 Y 2/2006
CN 101231155 A 7/2008
(Continued)

OTHER PUBLICATIONS

International Search Report for PCT/GB2009/002058.\*
(Continued)

*Primary Examiner* — James R Hulka
(74) *Attorney, Agent, or Firm* — McDonnell Boehnen Hulbert & Berghoff LLP

(57) ABSTRACT

A method for monitoring a fluid carrying conduit by introducing an acoustic pulse into the conduit, and interrogating an optic fibre positioned along the path of said conduit to provide distributed acoustic sensing. By measuring the response at each of a plurality of locations, a conduit condition profile can be derived. A condition profile can be obtained quickly and easily with minimum disruption to the pipeline infrastructure and contained flow. Existing optic fibres running along the path of a pipe can be employed for sensing purposes, allowing relatively long spans of pipeline to be monitored with only limited access to the pipe.

10 Claims, 3 Drawing Sheets

(51) Int. Cl.
*G01P 3/14* (2006.01)
*G01M 3/04* (2006.01)

(56) References Cited

U.S. PATENT DOCUMENTS

| | | | |
|---|---|---|---|
| 4,313,185 A * | 1/1982 | Chovan | 367/149 |
| 4,363,114 A * | 12/1982 | Bucaro et al. | 367/149 |
| 4,541,278 A * | 9/1985 | Marsh | G01N 29/14 422/53 |
| 4,590,799 A * | 5/1986 | Brown | F16L 55/48 15/104.063 |
| 4,747,309 A | 5/1988 | Weir | |
| 4,927,232 A | 5/1990 | Griffiths | |
| 5,417,112 A * | 5/1995 | Rosenberg | G01L 37/003 324/207.22 |
| 5,549,000 A * | 8/1996 | Brown | G01V 1/001 73/587 |
| 6,731,570 B1 | 5/2004 | Langdon | |
| 6,847,207 B1 | 1/2005 | Veach et al. | |
| 2006/0028636 A1 | 2/2006 | Payton | |
| 2006/0225507 A1 | 10/2006 | Paulson | |
| 2008/0088846 A1* | 4/2008 | Hayward et al. | 356/446 |
| 2008/0144016 A1* | 6/2008 | Lewis et al. | 356/73.1 |
| 2012/0067126 A1* | 3/2012 | Hartog | F16L 55/48 73/584 |

FOREIGN PATENT DOCUMENTS

| | | | |
|---|---|---|---|
| EP | 1 912 049 | 4/2008 | |
| EP | 1912050 A1 * | 4/2008 | H04B 10/08 |
| GB | 2305989 A * | 4/1997 | B08B 9/055 |
| GB | 2394549 A * | 4/2004 | F17D 5/00 |
| GB | 2 442 647 | 4/2008 | |
| GB | 2462096 A * | 1/2010 | F16L 55/48 |
| JP | 08 233932 | 2/1995 | |
| JP | 08 233564 | 9/1996 | |
| JP | 2000 088561 | 3/2000 | |
| WO | WO-2010010318 A2 * | 1/2010 | F16L 55/48 |

OTHER PUBLICATIONS

Li, "Recent Applications of Fiber Optic Sensors to Health Monitoring in Civil Engineering", Engineering Structures, Butterworth, GB, vol. 26, No. 11, Sep. 1, 2004, pp. 1647-1657.

Hsu, et al., "Velocity Filtering of Acoustic Well Logging Waveforms", IEEE Transactions of Acoustics, Speech and Signal Processing, vol. 37, No. 2, Feb. 1989, pp. 265-274.

Nagano, et al., "Automatic Algorithm for Triaxial Hodogram Source Location in Downhole Acoustic Emission Measurement", Geophysics, vol. 54, No. 4, Apr. 1989, pp. 508-513.

Unpublished U.S. Appl. No. 13/059,806, filed Feb. 18, 2011 in the name of Hill et al., entitled: "Tracking Objects in Conduits".

Preliminary Amendment filed in U.S. Appl. No. 13/059,806 dated Feb. 18, 2011.

Unpublished U.S. Appl. No. 13/059,810, filed Feb. 18, 2011 in the name of Hill et al., entitled: "Fibre Optic Acoustic Sensing".

Preliminary Amendment filed in U.S. Appl. No. 13/059,810 dated Feb. 18, 2011.

* cited by examiner

CONDUIT MONITORING

FIELD OF THE INVENTION

The present invention relates to conduit monitoring and inspection, and more particularly to subterranean pipeline monitoring.

BACKGROUND OF THE INVENTION

Pipelines are the most economically viable method of transporting fluid assets, most commonly oil and gas, but other types of pipeline also exist. A vast pipeline infrastructure exists today responsible for gathering, transporting and distributing these natural resources, with over three quarters of a million kilometers of oil and gas pipelines in the US alone. The continuing proper operation of these pipelines is of paramount importance, and failures carry massive economic loss, environmental impact and potentially catastrophic physical damage also.

Significant efforts are therefore made to monitor and inspect pipelines. The sheer size of many pipeline networks however, and the fact that many kilometres of pipelines consist of underground or sub-sea installations makes effective and efficient monitoring a difficult problem.

The most common pipeline inspection technique is the use of smart pigs. Pigs travel down a pipeline, driven by the pressure of the product being transported, and perform tasks such as cleaning, profiling or inspecting pipeline walls. Alternative monitoring techniques include simply walking the pipeline and satellite inspection, where pipes are accessible. Computational pipeline monitoring (CPM) systems are also used whereby field gathered information such as pressure, temperature and flow rate are used to estimate the hydraulic behaviour of the product being transported.

SUMMARY OF THE INVENTION

It is an object of the present invention to provide improved conduit monitoring.

In a first aspect the present invention provides a method for monitoring a fluid carrying conduit comprising interrogating an optic fibre positioned along the path of said conduit to provide distributed acoustic sensing; introducing an acoustic pulse into the conduit; measuring by distributed acoustic sensing the response to said acoustic pulse at each of a plurality of discrete longitudinal sensing portions; and deriving from said plurality of measurements a conduit condition profile.

In this way a condition profile can be obtained quickly and easily with minimum disruption to the pipeline infrastructure and contained flow. Existing optic fibres running along the path of a pipe can be employed for sensing purposes, by connecting suitable interrogation and processing apparatus. A significant proportion of pipelines will have pre-existing lengths of optic fibre running along the path of the pipeline. These are typically communications cables and/or for SCADA (Supervisory Control and Data Acquisition) of the pipeline which were laid at the same time as the pipeline for obvious logistical reasons. In such cases, because existing cables can be made to form part of the monitoring apparatus, relatively long spans of pipeline can be monitored with only limited access to the pipe required.

In certain embodiments the acoustic pulse is introduced into the fluid contained in the pipe by a dedicated impulser or acoustic transducer. This might typically take the form of a hydraulic ram, but other apparatus could be used to induce a pressure wave in the fluid carried by the conduit being monitored. The impulser can be permanently installed in the pipeline, or can be applied at an existing valve station or junction. It has been found that such pressure pulses are capable of travelling large distances through pipelines with little attenuation, and therefore a single pulse source can provide sufficient input for monitoring 20, 30 or 40 km or more of pipeline. Pulses can be introduced into the fluid during normal operation, while normal flow conditions continue in the conduit, resulting in little or no downtime for monitoring operations. Pulses are introduced at intervals of 10 seconds in one embodiment, and intervals of between 5 and 20 seconds might be employed. A typical monitoring period might be 10 minutes, but other periods are possible, and continuous monitoring may be employed.

As an alternative to a dedicated impulser it has been found that a pig travelling through a pipeline may be arranged to produce a series of pressure impulses. As the pig passes each girth weld in the pipe it encounters additional resistance and a slight overpressure builds behind the pig. As the pig subsequently passes the weld the pressure wave is released travelling in both directions down the pipe. The frequency of the pulses depends on the spacing of the welds and the velocity of the pig. In such cases it will be understood that the position of the source of the pulses gradually moves along the pipe, however this does not affect the monitoring method adversely. It is additionally noted that the pig may generate a higher acoustic signal as further constrictions or non-uniformities develop in the pipe over time, for example hydrocarbon build up or mechanical deformation. These can be identified in embodiments by looking for localised increases in generated acoustic signal over repeated pig passes.

A further possible source of an acoustic or pressure pulse in a conduit is a sudden crack or leak. The resulting pressure pulse can be detected and used to identify and/or locate the source and hence the location of the crack or leak. A further aspect of the invention therefore provides a method for monitoring a fluid carrying conduit comprising interrogating an optic fibre positioned along the path of said conduit to provide distributed acoustic sensing; detecting an acoustic pulse at each of a plurality of discrete longitudinal sensing portions; and determining the source of said detected pulse.

The condition profile of the pipe need not be explicitly analysed to determine corresponding physical characteristics (although this is possible). More use may be derived by monitoring a pipeline over a period of time to obtain one or more profiles, and comparing these profiles to determine changes in characteristics. Thus two pipeline profiles may be obtained corresponding to two dates having a known time separation. Differences in the profile can be determined using data analysis techniques to obtain information concerning which portions of the pipe have undergone physical changes, and hence the location of those changes. More complex statistical analysis of profiles can be undertaken if a set of multiple profiles is built up over time, and profiles will typically be obtained at regular intervals for this purpose. Additionally or alternatively profiles can be taken before or after planned maintenance or repair work to characterise known changes to the pipeline.

Changes in the pipe, (and possibly ground conditions surrounding the pipe) can therefore be monitored over time intervals, and the location and characterising information concerning those changes can be provided. This information may prompt further actions, such as maintenance, cleaning, physical inspection or repair.

In some embodiments the amplitude response to the acoustic pulse is measured. This may be performed by integrating across the available bandwidth for each channel. Further analysis of the data returned from distributed sensing however allows the spectral content of each channel to be provided in certain embodiments, enabling enhanced condition monitoring capability. Distributed acoustic sensing in embodiments of the present invention senses seismic signals (both P pressure and S shear vibration waves) which are within a bandwidth from 0 Hz-5 kHz. Higher frequencies are commonly strongly attenuated however, and the range from 0 Hz to 1 kHz is more commonly monitored.

The sensing fibre for distributed sensing may be located inside the conduit, on the exterior surface of the conduit, directly buried adjacent to the conduit or in a separate adjacent conduit, in various different embodiments. There is no prescribed position for the sensing fibre, provided its location is such that it is able to detect a sufficient response to the acoustic pulse. Because of the high sensitivities possible in fibre optic sensing, whereby induced phase differences can be measured using interferometric techniques, the potential scope for positioning the fibre, or the scope for selecting an existing fibre is large. Generally speaking however, it is preferable for the fibre to be located at or within approximately 3 m of the fluid carrying conduit, and more preferably at or within approximately 1.5 m from the centreline of the conduit to be monitored.

Fibre-optic distributed acoustic sensing is provided by interrogating the fibre with optical pulses at different frequencies in many embodiments. The single length of fibre is typically single mode fibre, and is preferably free of any mirrors, reflectors, gratings, or change of optical properties along its length. This provides the advantage that an unmodified, substantially continuous length of standard fibre can be used, requiring little or no modification or preparation for use. Such embodiments typically operate by detecting Rayleigh backscattered light from the sensing fibre and using the frequency relationship of the interrogating pulses to determine the acoustic signals incident on the fibre along its length. Any suitable distributed sensing technique may be employed however. A suitable DAS system is described in GB 2442745 for example.

Since the fibre has no discontinuities, the length and arrangement of fibre sections corresponding to each channel is determined by the interrogation of the fibre. These can be selected according to the physical arrangement of the fibre, and also according to the type of monitoring required. In this way, the distance along the fibre, and the length of each fibre section, or channel resolution, can easily be varied with adjustments to the interrogator changing the input pulse width and input pulse duty cycle, without any changes to the fibre. Data from multiple channels can be provided substantially simultaneously in embodiments.

The spatial resolution of the distributed fibre optic sensing is less than or equal to 30 m in many embodiments, and less than or equal to 20 m or 10 m in certain embodiments. In certain embodiments the optic fibre is interrogated to provide sensed data over a distance greater than or equal to 20 km, and distances of greater than or equal to 30 km or 40 km are achievable in other embodiments.

A further aspect of the invention provides pipeline monitoring apparatus comprising an optic fibre interrogator adapted to interrogate an optic fibre and provide distributed fibre sensing; an impulser adapted to produce pressure pulses in a fluid contained in a pipeline; and a processor adapted to receive sensed data from said interrogator in response to said pressure pulses and to derive a conduit condition profile from said sensed data.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which.

DESCRIPTION OF THE INVENTION

Figure 1:
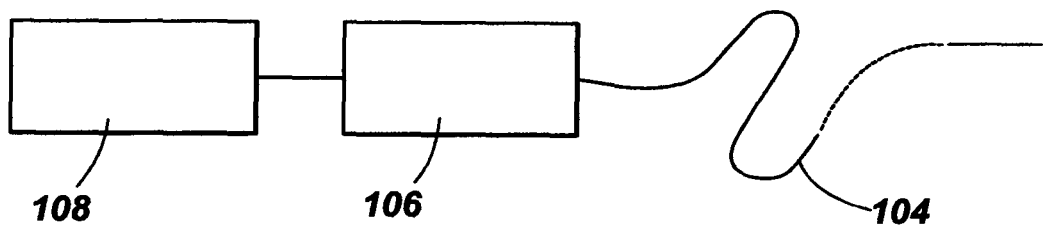
FIG. 1 illustrates the basic component of a distributed fibre optic sensor

FIG. 1 shows a schematic of a distributed fibre optic sensing arrangement. A length of sensing fibre 104 is connected at one end to an interrogator 106. The output from interrogator 106 is passed to a signal processor 108 and optionally a user interface, which in practice may be realised by an appropriately specified PC. The sensing fibre can be many kilometres in length, and in this example is approximately 40 km long.

The interrogator launches an interrogating optical signal, which may for example comprise a series of pulses having a selected frequency pattern, into the sensing fibre. The phenomenon of Rayleigh backscattering results in some fraction of the light input into the fibre being reflected back to the interrogator, where it is detected to provide an output signal which is representative of acoustic disturbances in the vicinity of the fibre. The form of the optical input and the method of detection allow a single continuous fibre to be spatially resolved into discrete sensing lengths. That is, the acoustic signal sensed at one sensing length can be provided substantially independently of the sensed signal at an adjacent length. The spatial resolution in the present example is approximately 10 m, resulting in the output of the interrogator taking the form of 4000 independent data channels.

In this way, the single sensing fibre can provide sensed data which is analogous to a multiplexed array of adjacent sensors, arranged in a linear path.

Figure 2:
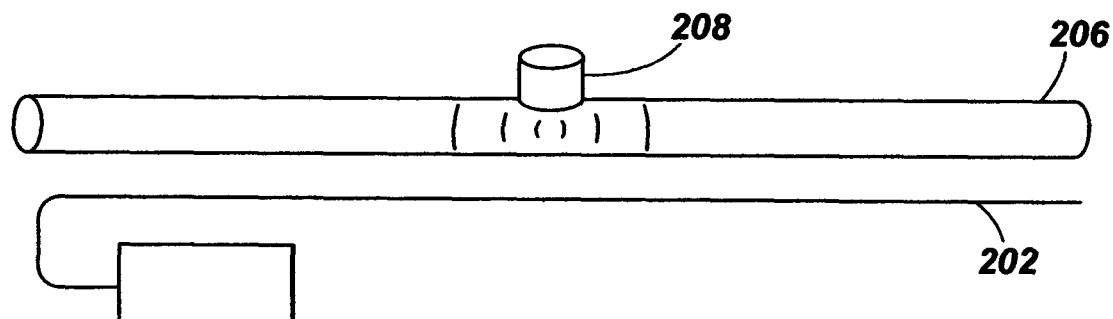
FIG. 2 shows a fibre sensor arranged along a length of pipeline

FIG. 2 shows an arrangement employing a method according to the present inventiOn, whereby a sensing fibre 202 (and associated interrogator and/or processor 204) is arranged along the path of a pipeline 206. An impulser 208 is arranged at a point along the pipeline, and adapted to introduce a pressure pulse into the fluid in the pipe. Impulser 208 can take a variety of forms, but in this example comprises a hydraulic ram. The pressure pulse generated travels in both directions down the pipe, away from the impulser. The pipe acts as a waveguide and it has been found that the pulse can travel for tens of kilometres without being unduly attenuated.

Figure 3:
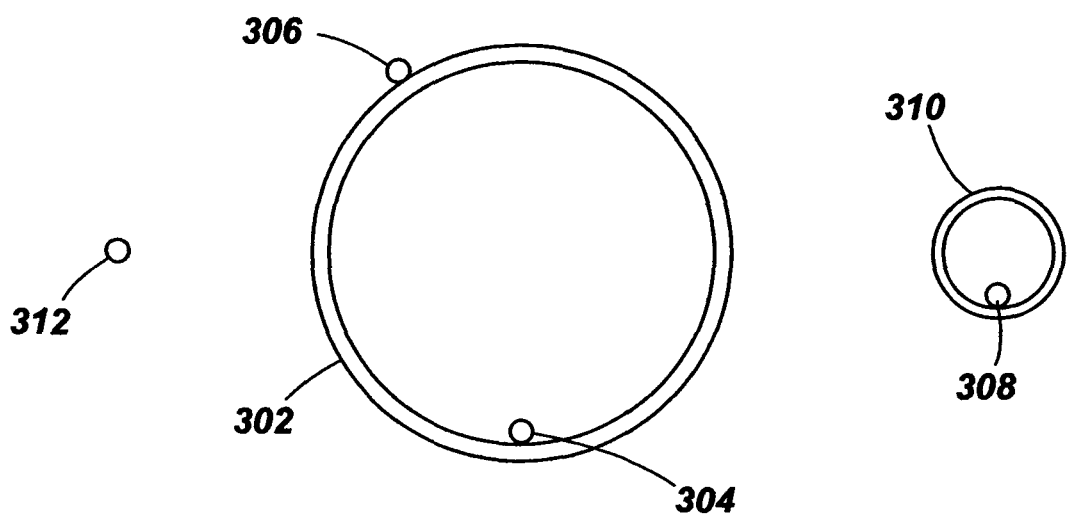
FIG. 3 is a cross section of a pipeline and sensing fibres

As the pulse passes through any particular length of pipe, it creates an acoustic disturbance which can be detected by the distributed fibre sensor 202. FIG. 3 shows a cross section of a pipe 302 with possible locations of a sensing fibre able to detect the response of the pulse in the pipe.

The pipe in the present example has an internal diameter of 1200 mm and 50 mm carbon steel walls, carrying natural gas at approximately 80 bar. The pipe may be buried approximately 1-2 m below the surface which may be ground level or the seabed in certain situations. Fibre 304 is located inside the interior bore of the pipe 302, resting on the bottom of the pipe. Fibre 306 is bonded to the exterior of the pipe, while fibre 308 is located in a separate cable carrying conduit 310, located approximately 1.5 m from the centreline of the gas transmission pipeline. Conduit 310 is typically laid at the time of installing the pipeline to carry communication and/or SCADA lines. Fibre 312 is directly buried in the ground alongside the pipeline, at approximately 1 m from the pipe centreline.

It will be understood that for each different fibre placement, the measured response to the pressure pulse in the pipe will be different, and will depend on different factors. The signal sensed by fibre 308 will depend on the transfer characteristics of the ground between pipe 302 and conduit 310, for example, while sensing fibres 304 and 306 will be less affected. As will be explained below however, this does not adversely affect the present invention, and any fibre placement which produces a reliable response to the pressure pulse can be used.

Figure 4:
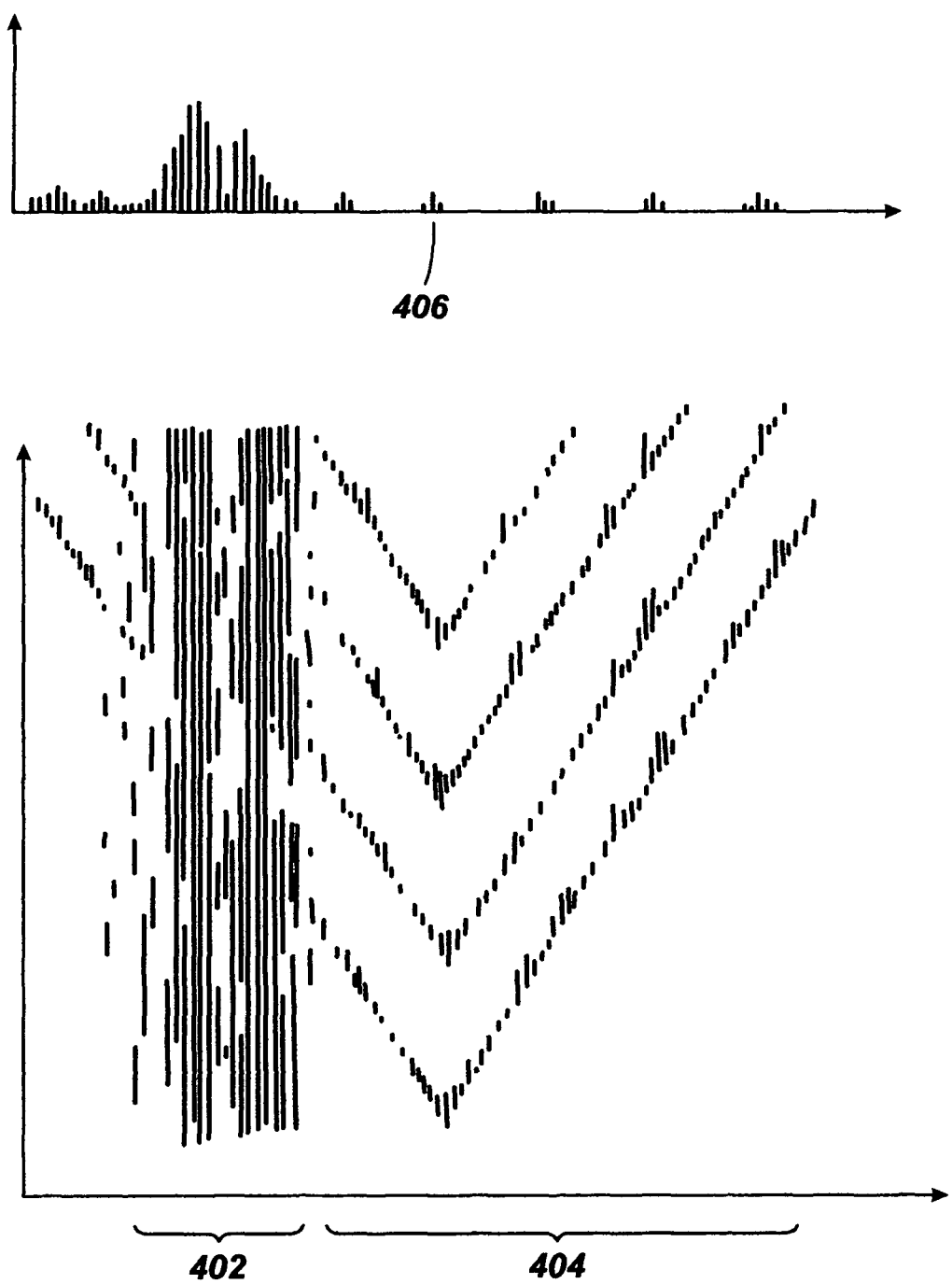
FIGS. 4 and 5 show pipeline monitoring data outputs.

FIG. 4 shows a histogram and associated waterfall plot illustrating a distributed fibre sensor output in response to a series of pressure pulses introduced into an adjacent pipeline. Data in FIG. 4 was produced by a sensing fibre in a conduit. The x-axis of the histogram and waterfall is the length of the sensing fibre which is this case is approximately 40 km. The histogram shows, at an instant in time the amplitude of the sensed acoustic signal returned from the sensing fibre. In order that all 4000 channels can be viewed, each bar in the diagram represents the peak amplitude from a group of 10 m sections. Individual 10 m could be viewed if desired. The lower plot is a waterfall with an update rate of 0.05 seconds showing sound intensity against distance and time, time plotted along the y-axis of the waterfall, most recent data plotted at the top.

Two main features can be seen from the waterfall plot. The first is an area of constant activity towards the left of the plot at 402, corresponding to a length of approximately 4000 m of the sensing fibre. This is attributable to an industrial unit located over that section of fibre, producing a steady vibrational noise. Secondly distinct chevron patterns can be seen, most clearly in region 404, away from the constant noise of the industrial unit.

The vertex of each chevron is located at point 406 along the fibre, corresponding to the location of an impulser. The 'V' shape of the plot corresponds to the pressure pulse moving along the pipe in both directions away from the source of the pulse, and the slope of the 'V' shape corresponds to the speed of sound in the pressurised gas contained within the pipe which in this case is approximately 400 ms$^{-1}$. It can be seen that a series of pressure pulses are introduced into the gas, and multiple traces are formed. On the top histogram plot, the individual pulses appear in their respective positions at that instant, spaced along the fibre.

Figure 5:
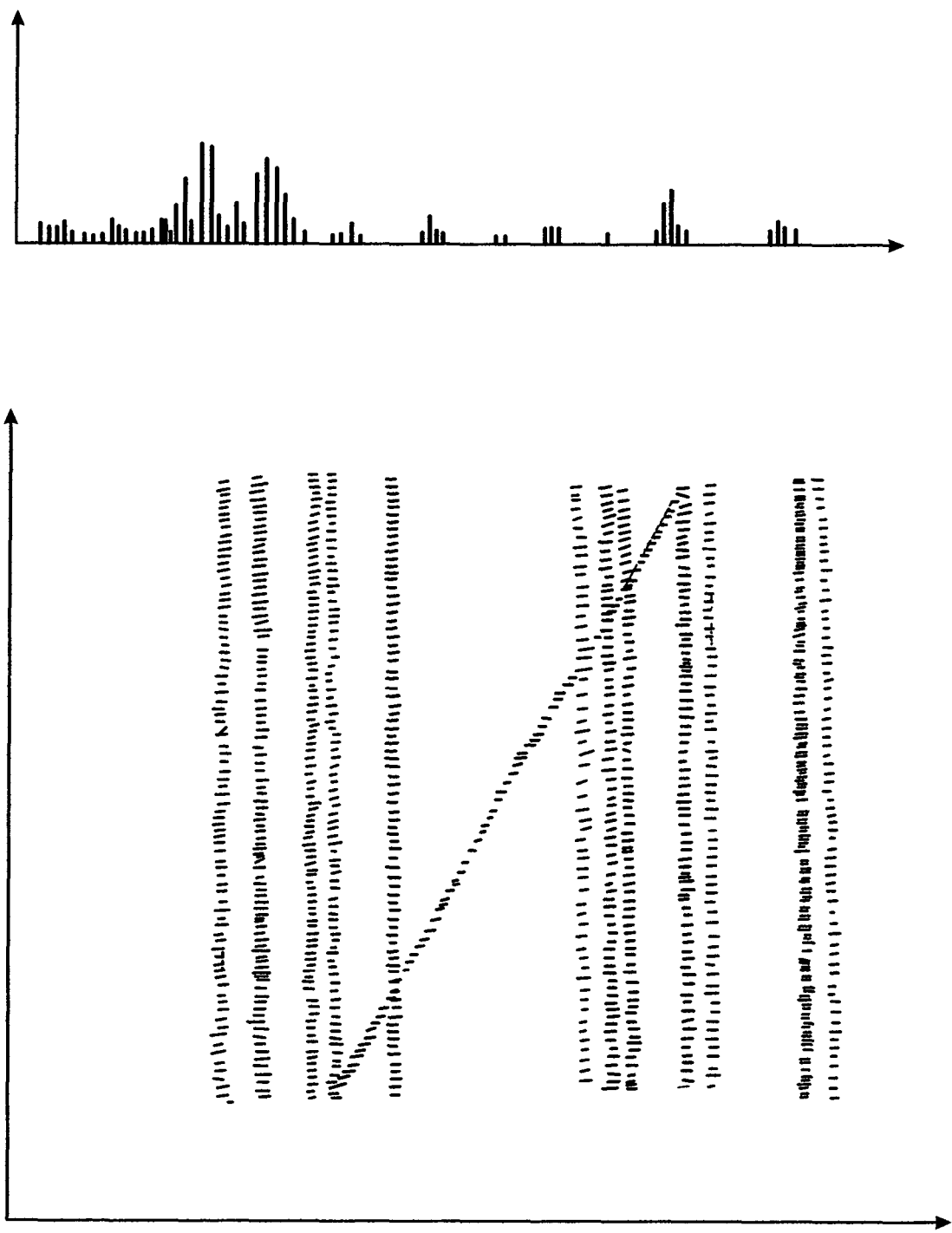

FIG. 5 shows data in a similar form to that of FIG. 4, but with the axes of both the histogram and the lower waterfall plot similarly rescaled. In FIG. 5, the x-axis of the waterfall plot corresponds to a section of the sensing cable approximately 4 km long (as opposed to 40 km in FIG. 4) and the update rate of FIG. 5 is set to 2 seconds (as opposed to 0.05 sec in FIG. 4).

Data for FIG. 5 comes from the same pipe and fibre arrangement as in FIG. 4, but taken during a pigging run, and the path of the pig is clearly visible as a diagonal trace 502 in the waterfall plot. Also visible in the waterfall plot of FIG. 5 are a series of vertical lines having various intensities. The lines correspond to various locations along the length of the pipe, and can be considered as a fingerprint or barcode of the pipe, the pattern of lines corresponding to the physical characteristics or condition of the pipe, and to a certain extent its immediately surrounding environment (in this case the ground in which it is buried).

Considering the condition profile provided by this barcode effect, it will be understood that this corresponds to the chevron effect of FIG. 4, but viewed with a compressed time axis. The pressure pulses passing through the pipe can be thought of as acoustically 'illuminating' each portion of the pipe they pass through, eliciting a response from the pipe and its environment, whereby the response is detected by the distributed sensing fibre. By averaging over time, it can be seen that some sections of the pipe have a different response to the pulses than others. Possible causes of these differences include a local hydrocarbon build up on the pipe wall, a weakness in the pipe wall or variation in the wall profile, or variation in the ground composition in the vicinity of the pipe for example. In this way the plot provides a condition profile of the pipe at a given time or date.

It is noted that while the pressure pulses seen in FIG. 4 are produced by a dedicated impulser, the pulses in FIG. 5, which give rise to the condition profile of the pipe are created as the pig passes each girth weld in the pipe, as explained above.

Although not illustrated the spectral content of the sensed data can be extracted and provided. This would add an extra dimension to the plots of FIGS. 4 and 5, and would enable enhanced condition monitoring capability. Seismic signals are typically dominant at frequencies below 500 Hz due to the high attenuation of higher frequencies through the ground.

For example, by looking at a selected frequency band or bands, the 'noise' from the industrial plant in region 402 of FIG. 4 could be filtered out. A pipe profile or barcode as explained above, additionally decomposed by frequency provides more detail to a user and allows more sophisticated analysis. For example different types of physical phenomena may be associated with particular frequency bands. For instance, changes in the higher frequency bands may be indicative of turbulent flow in the pipe caused by the build-up of wax deposits whereas changes in the lower frequency band may be indicative of changes to the ground condition in which the pipe is laid. The interpreted results may therefore provide a greater quantity and quality of information to a user.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method for monitoring a fluid carrying conduit comprising a pipeline the method comprising the steps of:
   interrogating an optic fibre positioned along the path of said conduit to provide distributed acoustic sensing;
   passing a pig through the pipeline, the pig generating (inducing) at least one acoustic pulse as it passes through the pipeline;
   measuring by distributed acoustic sensing the response to said at least one acoustic pulse at each of a plurality of discrete longitudinal sensing portions; and
   deriving from said plurality of measurements a conduit condition profile.

2. A method according to claim 1, comprising deriving one or more further conduit profiles and comparing said profiles to determine a change in conduit characteristics.

3. A method according to claim 2, comprising determining the longitudinal location of a change in conduit characteristics.

4. A method according to claim 1, wherein the amplitude of response to said at least one acoustic pulse is measured.

5. A method according to claim 1, wherein the spectral content of the response to said at least one acoustic pulse is measured.

6. A method according to claim 1, wherein the distributed acoustic fibre is located inside said conduit.

7. A method according to claim 1, wherein the distributed acoustic fibre is located adjacent to said conduit.

8. A method according to claim 1, wherein the spatial resolution of said distributed fibre optic sensor is less than or equal to 25 m.

9. A method according to claim 1, wherein the length of said distributed fibre optic sensor is greater than or equal to 20 km.

10. Pipeline monitoring apparatus comprising:
    an optic fibre interrogator adapted to interrogate an optic fibre and provide distributed acoustic sensing;
    a processor adapted to receive sensed data from said interrogator in response to acoustic pulses generated by a pig passing through the pipeline and to derive a conduit condition profile from said sensed data.

* * * * *

UNITED STATES PATENT AND TRADEMARK OFFICE
CERTIFICATE OF CORRECTION

PATENT NO. : 10,900,860 B2
APPLICATION NO. : 13/059795
DATED : January 26, 2021
INVENTOR(S) : David John Hill et al.

Page 1 of 1

It is certified that error appears in the above-identified patent and that said Letters Patent is hereby corrected as shown below:

On the Title Page

In item (73) please replace "QinetiQ Limited" with --Optasense Holdings Ltd.--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*